United States Patent [19]

Fasulo et al.

[11] Patent Number: 5,240,998
[45] Date of Patent: Aug. 31, 1993

[54] THERMOPLASTIC COMPOSITIONS BASED ON A VINYL AROMATIC CO-POLYMER AND A POLYAMIDE RESIN

[75] Inventors: Gian C. Fasulo, San S. Di Curratone; Dario Ghidoni, Gonzaga; Giuseppe Cigna; Anna G. Rossi, both of Mantova; Italo Borghi, Ferrara, all of Italy

[73] Assignee: Montedipe, Italy

[21] Appl. No.: 606,991

[22] Filed: Oct. 31, 1990

[30] Foreign Application Priority Data

Nov. 9, 1989 [IT] Italy .................. 22324 A/89

[51] Int. Cl.⁵ .............................. C08L 77/00
[52] U.S. Cl. ...................... 525/66; 528/179
[58] Field of Search .......................... 525/66

[56] References Cited

U.S. PATENT DOCUMENTS 4,777,211 10/1988 Lavengood et al. .............. 525/66
4,795,782 1/1989 Lutz et al. ........................ 525/66

Primary Examiner—Ana L. Carrillo
Attorney, Agent, or Firm—Morgan & Finnegan

[57] ABSTRACT

Thermoplastic compositions having improved mechanical, thermal and rheological characteristics comprising a blend of:

(A) an impact resistant vinyl aromatic copolymer containing a vinyl aromatic monomer, an ethylenically unsaturated nitrile and a substrate of an olefinic elastomer;
(B) a polyamidic resin;
(C) a compatibilizing polymer containing from 0.01 to 4% mol. of a functional group reactive with the polyamide resin and
(D) a polyolefin.

21 Claims, No Drawings

THERMOPLASTIC COMPOSITIONS BASED ON A VINYL AROMATIC CO-POLYMER AND A POLYAMIDE RESIN

FIELD OF THE INVENTION

The present invention relates to thermoplastic compositions based on a vinyl aromatic copolymer and a polyamide.

In more detail the present invention relates to thermoplastic compositions based on an impact resistant styrenic copolymer and a polyamide having improved mechanical properties, such as impact and temperature resistance; these properties are particularly suitable for injection molding and thermoforming.

DISCUSSION OF THE PRIOR ART

As known, impact resistant vinyl aromatic copolymers are obtained by bulk or bulk-suspension polymerization of olefinic rubber solutions, such as ethylene-propylene (EPM) or ethylene-propylene-non conjugated diene (EPDM) solutions, in a vinyl aromatic monomer as such or in blend with other polymerizable ethylenically unsaturated monomers.

Styrene-acrylonitrile copolymers grafted on olefinic rubbers (AES) show a very good impact resistance but their low thermoresistance makes them unsuitable for particular applications where temperatures of 120°-160° C. are used, or for the manufacture of products which come into contact with parts heated at such temperatures.

It is known that this lacking property of AES copolymers can be overcome by blending them with other polymers having a good thermoresistance such as for example a polyamide. In fact, such resin shows a good elongation, high energy absorbtion, especially in ball drop tests, and a very good thermoresistance; anyway the high notch sensitivity and water absorbtion constitute a significant limitation for the use of these resins. Moreover, polyamides are seldom compatible with the impact resistant vinyl aromatic copolymers, therefore, the interfaces between the domains of the blend components represent weak areas along which the breaking of the material takes place.

In order to make polyamides compatible with impact resistant vinyl aromatic copolymers, it was proposed in the German patent No. 3120803, to use a compatibilizer constituted by a styrene copolymer containing from 2 to 50% by weight of carboxylic acid and/or anhydride reactive groups. The compatibilizing copolymer described in that publication has a molecular weight between 500 and 20,000; in particular 500 and 7,000, preferably between 800 and 2,000.

The so obtained mixtures having improved impact strength (IZOD) properties aren't satisfactory for several applications.

According to the European patent No. 202214, the impact strength of the polyamide compositions can be improved by preparing a blend containing:

a) 5-79.5% by weight of a composition grafted on rubber consisting of grafted copolymer of 15-85% by weight of at least a monomer selected from the group of $C_1$-$C_4$ alkyl methacrylate, $C_1$-$C_4$ alkyl acrylate, methaacrylonitrile and acrylonitrile and of 85-15% by weight of a vinyl aromatic monomer, wherein the monomers are polymerized in the presence of and grafted on a rubber substrate having a glassy transition temperature below 0° C., wherein the percentage by weight of rubber is from 5 to 80% and the percentage by weight of grafted copolymer is from 95 to 20%;

b) 94.5-20% by weight of a polyamide, and c) 0.5-60% by weight of a compatibilizing copolymer comprising a copolymerized, functionalized monomer able to react with the polyamide, in which the functionalized monomer concentration is between 0.05 and 4% mol. of the copolymer.

Although the so obtained compositions don't have an optional combination of properties for all of the required applications.

In particular an increase in impact srenght can be obtained by using an excess of impact resistant vinyl aromatic polymer with respect to the polyamid resin, however, this increase is at the cost of the thermoresistance. Therefore the obtained products can't be worked at a temperature over 120°-140° C. On the contrary, by increasing the polyamide resin content, the thermoresistance of the composition increases, however, it is achieved at the cost of the impact strength.

DISCUSSION OF THE INVENTION

Now it has been found by the Applicant that the addition of a polyolefine to the above mentioned thermoplastic compositions, consisting of an impact resistant vinyl aromatic copolymer and a polyamide resin, yields an optimal combination of the properties of said compositions, making them applicable in all fields where high impact strength and high thermoresistance are required.

Object of the present invention is, therefore, a thermoplastic composition having an optimal balance of the mechanical, thermal and rheological properties, comprising:

A) an impact resistant vinyl aromatic copolymer containing from 5 to 40% by weight of an ethylenically unsaturated nitrile, from 15 to 50% by weight of an olefinic elastomer and from 10 to 80% by weight of a vinyl aromatic monomer;

B) a polyamide resin in such quantity that the ratio by weight between the impact resistant vinyl aromatic copolymer (A) and the polyamide resin is between 80:20 and 20:80;

C) from 0.01 to 20% by weight, with respect to the blend of an impact resistant vinyl aromatic copolymer (A) and polyamide resin (B) of a compatibilizing copolymer containing a functionalized, copolymerized monomer able to react with the polyamide, wherein the concentration of the functionalized monomer is between 0.01 and 4% mol. of the copolymer; and D) from 1 to 5% by weight of a polyolefin, with respect to the blend of vinyl aromatic copolymer (A) and polyamide resin (B).

The ratio by weight of vinyl aromatic copolymer and polyamide resin (A/B) is preferably between 70:30 and 30:70 and the quantity of compatibilizing copolymer (C) is preferably between 1 and 10% by weight with respect to the blend A+B.

The component A of the thermoplastic composition of the present invention is an impact resistant vinyl aromatic copolymer preferably containing from 25 to 35% by weight of an ethylenically unsaturated nitrile, from 20 to 40% by weight of an olefinic elastomer and from 25 to 55% by weight of a vinyl aromatic monomer.

The olefinic elastomeric component, which is the support on which the ethylenically unsaturated nitrile and the vinyl aromatic monomer are partly grafted and partly mechanically stucked in a form of copolymer of ethylenically unsaturated nitrile and vinyl aromatic monomer, is a rubbery copolymer having a Mooney viscosity between 10 and 150 ML-4 at 100° C., of at least two different linear alpha mono-olefines, such as ethylene, propylene, butene-1, octene-1 with at least another copolymerizable monomer generally a polyene and typically a non conjugated diene. Preferably one of the alpha mono-olefines is ethylene together with another alpha-mono-olefine having a longer chain. The ratio by weight of the ethylene with respect to the other alpha-mono-olefine in the rubbery copolymer is usually in the range from 20/80 to 80/20. Particularly preferred copolymers are the terpolymers of ethylene-propylene-non conjugated diene, in which the non conjugated diene can be cyclic or noncyclic such as:-5-methylene-2-norbornene; 5-ethylidene-2-norbornene; 5-isopropylene-2-norbornene; pentadiene-1,4; exadiene-1,4; exadiene-1,5; eptadiene-1,5; dodecatriene-1,7, 9; methyleptadiene-1,5; norbornadiene-2,5; cyclo-octadiene-1,5; didicyclopentadiene; tetrahydroindene; 5-methyl-tetrahydroindene etc. The diene content of the rubbery terpolymer is between 5 and 20% by weight and preferably between 8 and 18% by weight of dienic monomeric units.

Particularly interesting results are obtained by using a rubbery terpolymer having a Mooney viscosity (ML-4), measured at 100° C., between 30 and 90 and a iodine number above 5, preferably between 10 and 40.

The term vinyl aromatic monomer, as used in the present description and in the claims, means the ethylenically unsaturated compounds having the general formula:

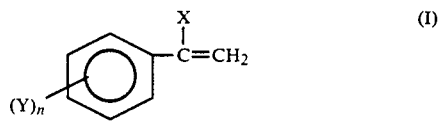

(I)

in which:
X represents hydrogen or an alkyl radical having from 1 to 4 carbon atoms;
Y represents hydrogen, a halogen or an alkyl radical having from 1 to 4 carbon atoms and
n is 0 or an integer between 1 and 5.

Examples of vinyl aromatic monomers having the above reported general formula are: styrene; methyl-styrene; mono-di-, tri-, tetra- and penta-chloro-styrene and the corresponding alpha-methyl-styrenes; styrenes alkilated in the nucleous and the corresponding alpha-methyl-styrenes such as ortho- and para-methyl-styrenes; ortho- and paraethyl-styrenes; ortho- and para-methyl-alpha-methyl-styrenes etc.

These monomers can be used as such or blended together. The term of ethylenically unsaturated nitrile means first of all and preferably acrylonitrile; even if other acrylic monomers such as methacrylonitrile and alkyl $C_1$-$C_4$-esters of the acrylic or methacrylic acid can be used.

Examples of copolymerization methods to obtain impact resistant styrenic copolymers used in the composition of the present invention are described in the Italian patent No. 792.269 and in the U.S. Pat. Nos. 3,819,765, 3,489,822, 3,642,950 and 3,849,518 whose content, as reference, is embraced by the present application.

It is implied that in the grafting copolymerization not all the monomer forming the resin is grafted on the rubbery substrate; a part of the monomers forms a free resin that is present in physical mixture with the grafted copolymer. The quantity of monomer grafted on the copolymer can be determined by extraction of the product with a solvent of the non grafted resin.

The component A is typically an AES resin that is an EPOM rubber on which the styrene-acrylonitrile copolymer (SAN) is partly grafted and partly mechanically stucked.

The polyamide resins (component B), useful to the aim of the present invention, are the conventional ones, injection moldable, generally known as nylon resins including the aliphatic polylactams obtained by opening the lactams ring and the polyamides produced by polycondensation of an aliphatic diamine, containing from 4 to 14 carbon atoms, with an aliphatic bicarboxylic acid containing from 4 to 12 carbon atoms. Examples of suitable polyamide resins include: nylon 4; nylon 6; nylon 7; nylon 11; nylon 12; nylon 6,6; nylon 6,9; nylon 6,10; nylon 6,12 etc. Partly aromatic nylons can also be used as component B in the compositions of the present invention. The term "partly aromatic nylons" means those obtained by partly or completly substitution of an aliphatic residue of an aliphatic nylon by an aromatic residue.

For example, the residues of adipic acid in nylon 6,6 can be substituted by terephthalic or isophthalic acid residues or by mixtures thereof similarly some aminic residues can have aromatic nature.

Preferred polyamide resins are nylon 6, nylon 6,6 or random copolymers nylon 6 and nylon 6,6.

The average molecular weight of the polyamide resins is advantageously above 10,000 and preferably above 15,000 and the melting point is preferably above 200° C.

The component C, used to make the impact resistant vinyl aromatic copolymer (A) compatible with the polyamidic resin (B), is a copolymer of a vinyl aromatic monomer, of the kind used in the component A, copolymerized with acrylonitrile, methacrylonitrile, $C_1$-$C_4$ alkyl methacrylate, $C_1$-$C_4$ alkyl acrylate or a mixture of these two monomers in a ratio by weight vinyl aromatic monomer/comonomer between 85:15 and 15:85.

The compatibilizing copolymer contains from 0.01 to 4 and preferably from 0.01 to 3% mol, of a copolymerized comonomer containing a functional group which reacts with amine or with carboxylic acid group of the polyamide. Generally the concentration of the comonomer containing the functional group is such to provide a concentration of functional groups from 1 to 20 per molecule of the component C.

The comonomers containing the functional group can be acrylic or methacrylic acid, monoalkylic esters $C_1$-$C_{12}$ of bicarboxylic acids such as monomethyl-maleate, mono-dodecyl fumarate, etc; bicarboxylic acids such as fumaric acid, maleic acid, itaconic acid, aconitic acid, citraconic acid etc. or the corresponding anhydrides; an epoxide such as a glycidyl acrylate, glycidyl methacrylate allyl-glycidyl ether, etc.

The average molecular weight of copolymers (C) is generally above 20,000 and preferably between 40,000 and 100,000.

The preferred component C is a terpolymer containing styrene, acrylonitrile and from 0.1 to 3 and preferably from 0.5 to 2% moles of maleic anhydride, and eventually alpha-methyl-styrene. The ratio by weight styrene/acrylonitrile is between 85/15 and 15/85 and preferably between 80/20 and 50/50.

The polyolefin, used as component D in the compositions of the present invention, can be polyethylene, polypropylene or an ethylene-propylene copolymer having mainly an ethylene content, such as for example a copolymer constituted from 75 to 98% by weight of ethylene and from 25 to 2% of propylene; polybutene and polypentene can be used too.

The term "polyethylene" means ethylene polymers having density between 0.90 and 0.97 g/cm$^3$ among which those known as low density polyethylene (LDPE), linear low density polyethylene (LLDPE), and high density polyethylene (HDPE). These polymers are commercially known by the trade mark for example of ESCORENE LL 1201(LLDPE) by EXXON, RIBLENE AK 1912 (LDPE) by ENICHEM etc.

The blends object of the present invention can be prepared by hot mixing in any known mixing unit, such as single or double screw extruders, Bambury mixer; mixing rollers etc. at a temperature between 200° and 300° C. The compositions can contain stabilizing agents, UV stabilizers or other additives intimately incorporated, such as plasticizers, lubricants, flame retardant agents, flow agents, antistatics, dyes, pigments, glass fibers or other inorganic fillers etc. in order to impart particular characteristics to the material.

The blends, object of the present invention, are easily processable and show a lot of properties that make them suitable to be used for the preparation of articles having both a high impact and a thermal resistance and a reduced water sensibility.

These blends have application in the motor transport fields, for the production of pieces that can be baked, parts that come into contact with the motor, electric household appliances, electronic and general technical articles having different forms such as cups, boxes, panels, sheets, rods, etc.

The blends can be used to produce foamed articles, using the known techniques.

EXAMPLES

The following examples are given to illustrate the invention without limiting the same.

In the examples all parts and percentages are expressed by weight, unless otherwise indicated.

EXAMPLES 1-4

By means of a double screw extruder Baker-Perkins MPC V30, mixtures are extruded, with degasing and at the temperature of 220°-290° C.; these mixtures consist of:

A) A styrenic copolymer containing 20.7% of acrylonitrile, 48.3% of styrene and 31% of EPDM rubber with Mooney viscosity 62-72 ML-4 at 100° C. and iodine number 18;

B) Nylon 6 produced by Montedipe with trade mark "TERNIL B 27", having average molecular weight of 18,000;

C) a compatibilizing copolymer containing 1.8% of maleic anhydride, 29.5% of acrylonitrile and 68.7% of styrene;

D) LLDPE polyethylene having a MFI=0.7 (ASTM D 1238), known by the trade mark "ESCORENE LL1201" by EXXON, or D') LDPE polyethylene having MFI=0.14 (ASTM D 1238), known by the trade mark "RIBLENE AK1912" by ENICHEM.

The ratios by weight between the components of the blend are reported in table I.

By cutting the strands coming out of the extruder, granules are obtained that are dried for 2-4 hours at 80°-90° C. To evaluate the mechanical and thermal properties the granules are injection molded at the temperature of 220°-240° on press Negri & Bossi V17 to obtain test pieces having the dimensions required by the ASTM standards.

The measured characteristics and the used methods are the following ones:

Mechanical Properties

The elongation at break in tensile tests and the elastic modulus have been determined according to ASTM D638, and the IZOD notched impact strength at 23° C. according to ASTM D256, on test pieces having a thickness of 3.2 mm.

Thermal Properties

The VICAT A softening temperature (1 KG in oil) has been determined according to ISO 306. The measured properties are reported in the following table I:

Rheological Properties

The Melt Flow index (M.F.I.) has been determined according to ASTM 1238, at 300° C. and 1.2 Kg.

TABLE I

| | EXAMPLES | | | |
|---|---|---|---|---|
| | 1* | 2* | 3 | 4 |
| COMPOSITIONS | | | | |
| A) Impact resistant styrenic copolymer | 60 | 50 | 50 | 50 |
| B) Nylon 6 | 35 | 45 | 42.50 | 42.50 |
| C) Compatibilizing copolymer | 5 | 5 | 5 | 5 |
| D) ESCORENE LL1201 | — | — | 2.5 | — |
| D') RIBLENE AK1912 | — | — | — | 2.5 |
| PROPERTIES UNIT | | | | |
| IZOD J/m | 820 | 300 | 830 | 700 |
| Elastic N/mm$^2$ modulus | 1800 | 2000 | 1600 | 1700 |
| Elongation % | 93 | 93 | 160 | 150 |
| VICAT °C. | 120 | 180 | 184 | 185 |
| M.F.I. g/10' | 15 | 14 | 13 | 17.5 |

*Comparative examples

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Thermoplastic compositions having improved mechanical, thermal, and rheological properties comprising a blend of:

A) an impact resistant vinyl aromatic copolymer containing from 5 to 40% by weight of an ethylenically unsaturated nitrile, from 15 to 50% by weight of an olefinic elastomer formed from at least two different alpha mono-olefins and a copolymerizable polyene monomer, and from 10 to 80% by weight of a vinyl aromatic monomer;

B) a polyamide resin having an amine and carboxylic acid group, said polyamide resin being present in such quantity that the weight ratio between the impact resistant vinyl aromatic copolymer (A) and the polyamide resin is between 80:20 and 20:80;

C) from 0.01 to 20% by weight, with respect to the impact resistant vinyl aromatic copolymer (A) and polyamide resin (B) blend, of a compatibilizing copolymer, said compatibilizing copolymer comprising:

1) a vinyl aromatic monomer, of the kind used in component (A), 2) a comonomer selected from acrylonitrile, methacrylonitrile, $C_1-C_4$ alkyl methacrylate, $C_1-C_4$ alkyl acrylate or mixtures thereof, wherein the vinyl aromatic/comonomer weight ratio is from 85:15 and 15:85, and 3) 0.1 and 4% moles of an additional comonomer selected from acrylic acid, methacrylic acid, ethylenically unsaturated bicarboxylic acids, ethylenically unsaturated bicarboxylic acid anhydrides, $C_1-C_{12}$ monoalkylic esters of ethylenically unsaturated bicarboxylic acids, or epoxides selected from glycidyl acrylate or methacrylate, or allyl-glycidyl ether; and D) from 1 to 5% by weight of a polyolefin selected from polyethylenes having a density between 0.90 and 0.97 g/cm$^3$, polypropylene, or ethylene-propylene copolymers having an ethylene content between 75 and 98% by weight and a propylene content of between 2 and 25% with respect to the vinyl aromatic copolymer (A) and polyamide resin (B) blend.

2. Thermoplastic compositions according to claim 1, in which the ratio by weight vinyl aromatic copolymer/polyamide resin (A/B) is between 70:30 and 30:70 and the quantity of the compatibilizing copolymer (C) is between 1 and 10% by weight with respect to the blend A+B.

3. Thermoplastic compositions according to claim 1, wherein the impact resistant vinyl aromatic copolymer (A) contains from 25 to 35% by weight of an ethylenically unsaturated nitrile, from 20 to 40% by weight of an olefinic elastomer formed from the at least two different alpha mono-olefins and the polyene monomer, and from 25 to 55% by weight of a vinyl aromatic monomer.

4. Thermoplastic compositions according to claim 1, wherein the olefinic elastomer is a rubbery copolymer having a Mooney viscosity between 10 and 150 ML-4 at 100° C.

5. Thermoplastic compositions according to claim 4, wherein an alpha mono-olefine is ethylene and the other mono-olefine has a longer chain, and the ratio by weight of ethylene with respect to the other alpha-mono-olefine ranges from 20/80 to 80/20.

6. Thermoplastic compositions according to claim 1, wherein the olefinic elastomer is a ethylene-propylene non-conjugated diene terpolymer, wherein the diene content is between 5 and 20% by weight with respect to the terpolymer.

7. Thermoplastic compositions according to claim 6, wherein the terpolymer has a Mooney viscosity (ML-4), measured at 100° C., between 30 and 90 and a iodine number above 5.

8. Thermoplastic compositions according to claim 1 wherein the vinyl aromatic monomer has the formula:

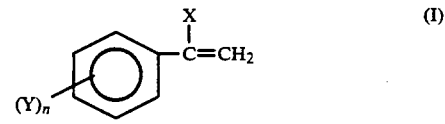

in which:

X represents hydrogen or an alkyl radical having from 1 to 4 carbon atoms;

Y represents hydrogen, a halogen or an alkyl radical having from 1 to 4 carbon atoms and n is 0 or an integer between 1 and 5.

9. Thermoplastic compositions according to claim 1, wherein the ethylenically unsaturated nitrile is acrylonitrile.

10. Thermoplastic compositions according to claim 1, wherein polyamide resin is nylon 6.

11. Thermoplastic compositions according to claim 1, wherein the compatibilizing copolymer has an molecular weight between 20,000 and 100,000.

12. Thermoplastic compositions according to claim 1, wherein the compatibilizing copolymer is a styrene, acrylonitrile and maleic anhydride terpolymer, wherein the maleic anhydride content is between 0.1 and 3 moles percent, and the ratio by weight styrene/acrylonitrile is between 85/15 and 15/85.

13. Thermoplastic compositions according to claim 1, comprising in addition stabilizing agents, plasticizers, lubricants, flame retardant agents, flow agents, antistatics, dyes, pigments, glass fibers, or other inorganic fillers.

14. Thermoplastic compositions according to claim 4, wherein the copolymerizable polyene monomer is a non-conjugated diene.

15. Thermoplastic compositions according to claim 6, wherein the diene content is between 8 and 18%.

16. Thermoplastic compositions according to claim 7 wherein the iodine number is between 10 and 40.

17. Thermoplastic compositions according to claim 1, wherein the additional comonomer concentration is from 0.1 to 3%.

18. Thermoplastic compositions according to claim 11, wherein the molecular weight is between 40,000 and 100,000.

19. Thermoplastic compositions according to claim 12, wherein the maleic anhydride content is from 0.5 to 2 moles percent and the ratio by weight styrene/acrylonitrile is between 80/20 and 50/50.

20. Thermoplastic compositions according to claim 13, wherein the stabilizing agents are UV stabilizers.

21. The thermoplastic composition of claim 1, wherein the polyene is a cyclic or acyclic non-conjugated diene.

* * * * *